United States Patent
Mahindra et al.

(10) Patent No.: US 9,338,693 B2
(45) Date of Patent: May 10, 2016

(54) SCHEDULING FRAMEWORK FOR ADAPTIVE VIDEO DELIVERY OVER CELLULAR NETWORKS

(71) Applicant: NEC Laboratories America, Inc., Princeton, NJ (US)

(72) Inventors: Rajesh Mahindra, North Brunswick, NJ (US); Mohammad Khojastepour, Lawrenceville, NJ (US); Sampath Rangarajan, Bridgewater, NJ (US); Jiasi Chen, Princeton, NJ (US)

(73) Assignee: NEC Corporation (JP)

( * ) Notice: Subject to any disclaimer, the term of this patent is extended or adjusted under 35 U.S.C. 154(b) by 120 days.

(21) Appl. No.: 14/210,941

(22) Filed: Mar. 14, 2014

(65) Prior Publication Data

US 2014/0269323 A1    Sep. 18, 2014

Related U.S. Application Data

(60) Provisional application No. 61/783,795, filed on Mar. 14, 2013.

(51) Int. Cl.
*H04W 28/06* (2009.01)
*H04W 28/12* (2009.01)
*H04W 28/22* (2009.01)
(Continued)

(52) U.S. Cl.
CPC .............. *H04W 28/12* (2013.01); *H04L 47/38* (2013.01); *H04L 65/4084* (2013.01); *H04L 65/605* (2013.01); *H04L 65/80* (2013.01); *H04W 28/22* (2013.01)

(58) Field of Classification Search
CPC ............................. H04W 18/12; H04L 47/38
USPC ....................................................... 370/236
See application file for complete search history.

(56) References Cited

U.S. PATENT DOCUMENTS

| | | | | |
|---|---|---|---|---|
| 2009/0298480 | A1* | 12/2009 | Khambete | G06F 17/30699 455/414.1 |
| 2012/0283863 | A1* | 11/2012 | Beum | G05B 19/41865 700/101 |
| 2012/0307886 | A1* | 12/2012 | Agarwal | H04W 4/18 375/240.02 |

(Continued)

OTHER PUBLICATIONS

Overview of MPEG-DASH Standard, DASH Industry Forum, http://dashif.org/mpeg-dash, Dec. 2012, pp. 1-3.
Kokku, et al., "Opportunistic Alignment of Advertisement Delivery with Cellular Basestation Overloads", MobiSys, Jun. 28, 2011, 14 Pages.
Liebl, et al., "Advanced Wireless Multiuser Video Streaming Using the Scalable Video Coding Extensions of H.264/MPEG4-AVC", IEEE, Jul. 2006, pp. 625-628.
Lu, et al., "Video Streaming Over 802.11 WLAN With Content-Aware Adaptive Retry", IEEE, Jul. 2007, 4 Pages.

(Continued)

*Primary Examiner* — Mark Rinehart
*Assistant Examiner* — Peter Solinsky
(74) *Attorney, Agent, or Firm* — Joseph Kolodka

(57) ABSTRACT

Systems and methods for adaptive video delivery over a network, including receiving a plurality of types of data flows from one or more network base stations; separating resource management of the plurality of types of data flows, wherein the data flows include one or more of adaptive video streaming flows, regular video traffic flows, and other traffic flows by resource slicing. A scheduling framework for adaptive video delivery is instantiated; available choices of video bit rates for all users is received as input to an allocator; optimal allocation of resources is computed for all users by determining and selecting an optimal bit rate for each user using the allocator; the optimal bit rate being sent to an enforcer; resources across flows are isolated using the enforcer; and the optimal bit rate for each user is enforced using per-flow traffic shapers to maximize resource utilization without reaching network capacity.

14 Claims, 5 Drawing Sheets

(51) Int. Cl.
*H04L 12/811* (2013.01)
*H04L 29/06* (2006.01)

(56) References Cited

U.S. PATENT DOCUMENTS

| | | | | |
|---|---|---|---|---|
| 2013/0017855 A1* | 1/2013 | Hui | ...................... | H04W 16/28 |
| | | | | 455/522 |
| 2014/0068076 A1* | 3/2014 | Dasher | ................ | H04L 65/4076 |
| | | | | 709/226 |
| 2014/0068690 A1* | 3/2014 | Luthra | ............... | H04N 21/4363 |
| | | | | 725/110 |

OTHER PUBLICATIONS

Zhang, et al. "Cross-Layer Optimization for Streaming Scalable Video over Fading Wireless Networks", IEEE Journal Apr. 2010, vol. 28, No. 3, pp. 344-353.
Burza, et al., "Adaptive Streaming of MPEG-based Audio/Video Content Over Wireless Networks", Journal of Multimedia, Apr. 2007, vol. 2, No. 2, pp. 17-27.
Kokku, et al., "NVS: A Virtualization Substrate for WiMAX Networks", ACM MobiCom, Sep. 2010, 12 Pages.
Kokku, et al., "Cellular Wireless Resource Slicing for Active RAN Sharing", in COMSNETS, Jan. 2013, pp. 1-14.

* cited by examiner ized as to be able to scale the video bit-rate across multiple choices, and needs to allow for resource shares to be appropriately allocated to adaptive video flows.

SCHEDULING FRAMEWORK FOR ADAPTIVE VIDEO DELIVERY OVER CELLULAR NETWORKS

RELATED APPLICATION INFORMATION

This application claims priority to provisional application Ser. No. 61/783,795 filed on Mar. 14, 2013, incorporated herein by reference.

BACKGROUND

1. Technical Field

The present invention relates to video delivery over a network, and in particular, to a resource management framework for adaptive video delivery over cellular networks.

2. Description of the Related Art

Smartphones, tablets and high-speed mobile services are contributing to an explosion in data traffic on cellular networks. Scarcity in the wireless spectrum adds to the problems of supporting non-elastic traffic, which include video, leading to degradation in quality of experience (QoE) for users. In this regard, dynamically adaptive streaming is gaining popularity for streaming video over cellular networks. Adaptive streaming is a technique of video streaming over the hypertext transfer protocol (HTTP) where multiple versions of the source video are pre-encoded at different bit-rates at the video server.

Recently, video has spurred a mobile internet traffic explosion. However, the wireless network speeds are not increasing at the same rate, thereby often leading to congestion at the wireless access links. To overcome this challenge, industry is adopting hypertext transfer protocol (HTTP)-based adaptive video streaming technology that enables the dynamic adaptation of the video bit-rate to match the changing network conditions. Adaptive streaming leverages the underlying transmission control protocol (TCP) transport to estimate the available capacity for data flow, and to choose the most appropriate video bit-rate based on the estimated capacity. However, recent measurement studies have found problems in fairness, stability, and efficiency when multiple adaptive video flows compete for bandwidth on a common wired or wireless link. The problems manifest mainly as (a) instability implying unnecessary switching of the video bit-rate for a particular flow, (b) unfairness in the allocation of bit-rates among the competing flows and (c) potential under-utilization of the link.

SUMMARY

A method for method for adaptive video delivery over a network, comprising receiving a plurality of types of data flows from one or more network base stations; separating resource management of the plurality of types of data flows, wherein the plurality of types of data flows include one or more of adaptive video streaming flows, regular video traffic flows, and other traffic flows by resource slicing; instantiating a scheduling framework for adaptive video delivery; receiving available choices of video bit rates for all users as input to an allocator; computing optimal allocation of resources for all users by determining and selecting an optimal bit rate for each user using the allocator; sending the optimal bit rate for each user to an enforcer; isolating resources across the adaptive video streaming flows using the enforcer; and enforcing the optimal bit rate for each user using one or more per-flow traffic shapers to maximize resource utilization without reaching network capacity.

A system for adaptive video delivery over a network, comprising: a gateway configured to receive a plurality of types of data flows from one or more network base stations; a slice priority scheduler configured to separating resource management of the plurality of types of data flows, wherein the plurality of types of data flows include one or more of adaptive video streaming flows, regular video traffic flows, and other traffic flows by resource slicing; scheduling framework for adaptive video delivery; an allocator configured to receive available choices of video bit rates for all users as input, to compute optimal allocation of resources for all users by determining and selecting an optimal bit rate for each user using the allocator, and to send the optimal bit rate for each user to an enforcer; an enforcer configured to isolate resources across the adaptive video streaming flows; and one or more per-flow traffic shapers configured to enforce the optimal bit rate for each user using to maximize resource utilization without reaching network capacity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
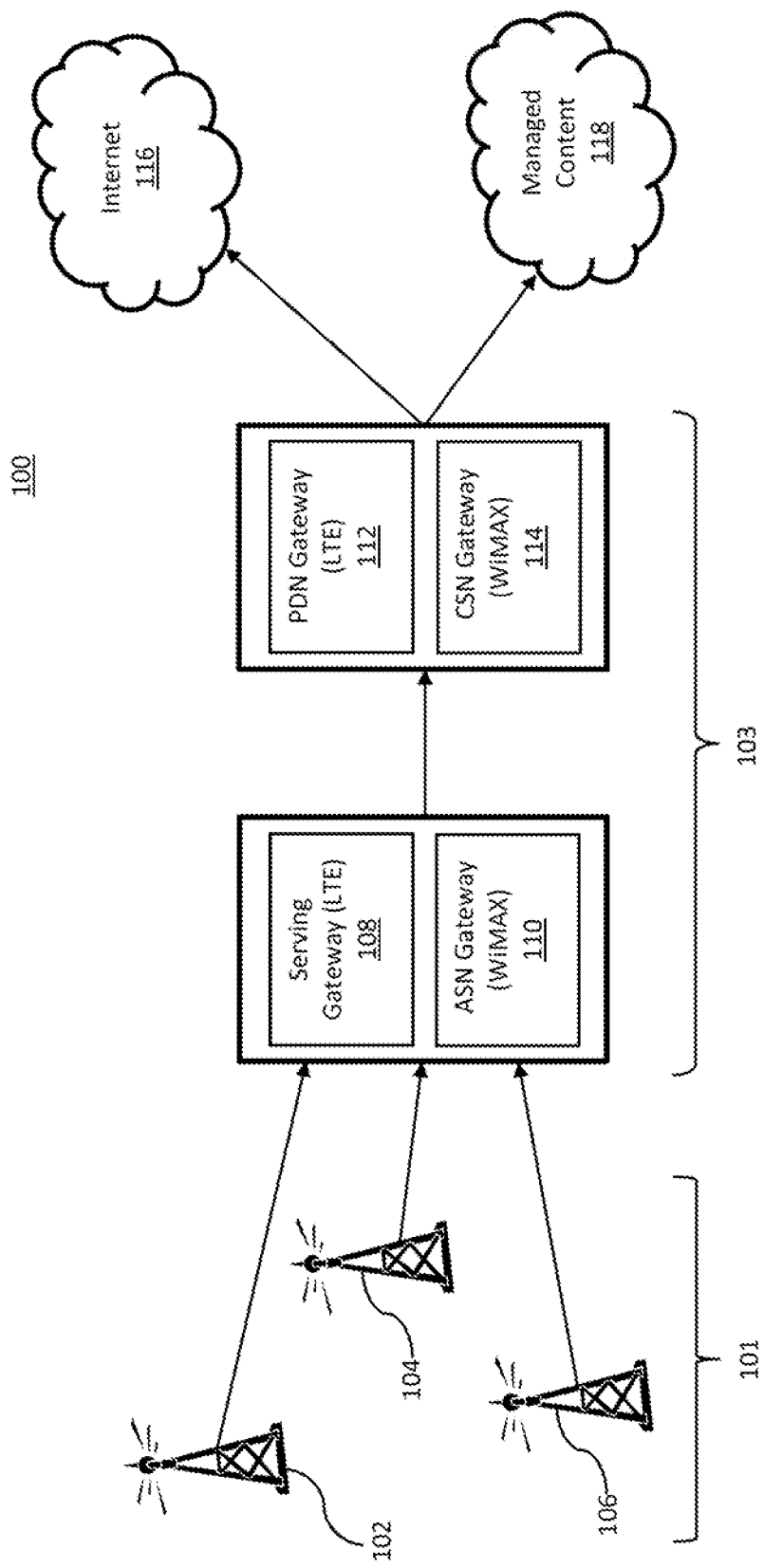
FIG. 1 shows a block/flow diagram illustrating a high-level view of a cellular network architecture according to the present principles.

Although current cellular base stations do incorporate sophisticated radio resource management techniques for flow scheduling, the framework lacks mechanisms for operators to effectively allocate resources across its users who stream adaptive videos. Research efforts for radio resource management on cellular networks include However schedulers, which are specifically designed for managing resources across single-rate traditional video streaming flows and elastic traffic flows, and they are not applicable for adaptive video streaming flows.

Adaptive video flows have certain unique properties that differ from the characteristics of regular videos. These include flows which are encoded at multiple bit-rate versions and codes that continuously adapt their bitrate to the throughput allocated to them. These characteristics of adaptive video flow place them somewhere in between elastic and non-elastic traffic types. Hence, the scheduling framework for adaptive video streaming should take into account these characteristics while allocating resources across such flows.

In one embodiment, a resource management framework according to the present principles is employed to addresses the above challenges. AVIS is designed to manage the radio resources of a cellular base station across multiple adaptive video flows to meet at least three goals: (a) optimal allocation as desired by the operator; (b) stability of bit-rates allocated to a user; and (c) high resource utilization. The resource management framework according to the present principles may separate the resource management of adaptive video flows from regular video flows and other data flows using resource slicing techniques.

In one embodiment, the resource management framework according to the present principles is a novel scheduler with two components, which include: (a) an Allocator that optimally allocates the bit-rates to the different adaptive video flows to ensure fairness and high utilization; and (b) an Enforcer that schedules the allocated bit-rate to each flow to ensure stability. There exist several challenges specific to the domain of wireless networks and adaptive video streaming, including: (1) the wireless link of a base station is highly dynamic and its capacity fluctuates significantly depending upon user arrival/departure, mobility pattern and locations of users and resource allocation policy; (2) the goals of the resource allocation are potentially conflicting (e.g., allocating resources to the video flows to achieve fairness may lead to significant bit-rate switches for users, while reducing the switches may cause unfairness, but an effective framework should incorporate appropriate mechanisms for network operators to achieve desired balance between these goals); and (3) in the case of adaptive video streams, the videos are encoded with multiple discrete bitrates and for each bit-rate version the instantaneous rate of the video fluctuates significantly around the average bit-rate, hence complicating the resource allocation problem.

In one embodiment according to the present principles, the resource management framework according to the present principles is employed as a gateway level solution to the above challenges, with minimum dependence on the specific cellular technology. Therefore, the resource management framework according to the present principles is easily adoptable on multiple 4G wireless access networks (e.g., WiMAX, LTE, etc.). The resource management framework according to the present principles may include a novel flow management framework that jointly performs optimal scheduling of resources across multiple adaptive video streaming flows and enforces resource isolation across the flows. To avoid degrading the quality of experience (QoE) for a user due to frequent bit-rate switching, the resource management framework according to the present principles may enable an operator to effectively maintain a balance between (a) optimal bit-rate allocated to the different users, and (b) the average bit-rate switches perceived by the users. Hence, the resource management framework according to the present principles enables fair allocation while ensuring good QoE for the users.

Several proprietary solutions in the industry, and certain standardized solutions (e.g., Dynamic Adaptive Streaming over hypertext transfer protocol (HTTP) (DASH)) employ HTTP-based adaptive video streaming. The common key idea is to fragment a video into multiple segments or chunks, and to encode each chunk using several bit-rates or resolutions. Each chunk (e.g., less than 10 seconds of video content) is stored as a regular file on the HTTP based video servers and is downloaded by the clients periodically using the standard HTTP GET requests. This mechanism enables current web servers and content delivery networks (CDNs) to support adaptive streaming without being significantly modified, and enables video traffic to traverse network address translations (NATs) and firewalls.

To enable such a framework, a file describing the list of the chunks of all the video bit-rate versions including the corresponding HTTP link to each chunk may be downloaded by the client prior to streaming. For instance, the standard DASH may define a Media Presentation Description (MPD) file, an extensible markup language (XML) file that contains the HTTP uniform resource locators (URLs) for each video chunk. Generally, the video player on the client implements the adaptation algorithm that chooses the most appropriate bit-rate for the next requested chunk based on current network and processor or memory conditions, and an estimate of the transmission control protocol (TCP) throughput is maintained at the client to predict the future network conditions. While most of the framework is standardized as part of the moving picture experts group (MPEG) based standard DASH, the adaptation algorithm to select the most appropriate bit-rate for future chunks is left to the specific implementation. It is noted that while dynamically adaptive video flows may be referred to as DASH video flows hereinafter, the present principles may be applied to any dynamically adaptive video flows.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level view of cellular network architecture 100 is illustratively depicted according to the present principles. In one embodiment, the cellular network architecture includes two main parts: a Radio Access Network (RAN) 101, and a Mobile IP Core 103. For long term evolution (LTE), the Mobile IP Core 103 may include a Serving Gateway 108 and a Packet Data Network (PDN) gateway 112 which may provide the functionalities of IP connectivity, authentication, authorization and accounting (AAA). For Worldwide Interoperability for Microwave Access (WiMAX), the Mobile IP Core 103 may include an Access Service Network (ASN) gateway 110 and a Connectivity Service Network (CSN) gateway 114. The gateways 108, 110, 112, 114 may handle and route traffic to and from any number of base stations (e.g., hundreds), and may provide access to the internet 116 and any managed content 118.

The RAN 101 may include a plurality (e.g., hundreds) of base stations or Evolved Node Bs (eNodeBs) 102, 104, 106, which may perform Radio Resource Management (RRM), perform interference mitigation, and initiate handovers. The base stations 102, 104, 106 may incorporate downlink and uplink media access control (MAC) schedulers which may achieve efficient wireless resource allocation across multiple user flows.

For example, in one embodiment, in both LTE and WiMAX, wireless (e.g., radio) resources may be orthogonal frequency-division multiple access (OFDMA) frames (or sub-frames) which may be divided into "resource blocks or slots" in the time and frequency domain. Downlink and uplink schedulers (not shown) may fill these resource blocks or slots with data packets from one or multiple user flows. To support diverse quality of service (QoS) requirements, flows may be mapped to one of the following bearer classes: (a) guaranteed bit rate (GBR) bearers and (b) non-GBR bearers.

GBR bearers are suited for real-time application, such as voice over IP (VoIP) and video. Each flow may have an associated minimum GBR rate that may define the minimum allocation the flow is selected to receive. Generally, the minimum GBR rate is set to the average bitrate in the case of a video flow. A maximum GBR rate may also be defined to limit the maximum resource allocation for the flow. Non-GBR bearers, however, do not receive any minimum resource allocation. These bearers may be used for applications such as web browsing or file transfer protocol (FTP) transfers.

Generally, base station schedulers are designed to allocate the resources to the GBR flows by employing a proportional fair scheduling policy. This means that the resources may be distributed across the GBR flows in proportion to their minimum GBR rate and link conditions (e.g., physical bit-rate defined by the current modulation and coding scheme). Hence, proportional fairness enables the schedulers to perform a tradeoff between fairness and base station capacity. Once all GBR flows are satisfied, the unused resources may be allocated to the non-GBR flows.

Figure 2:
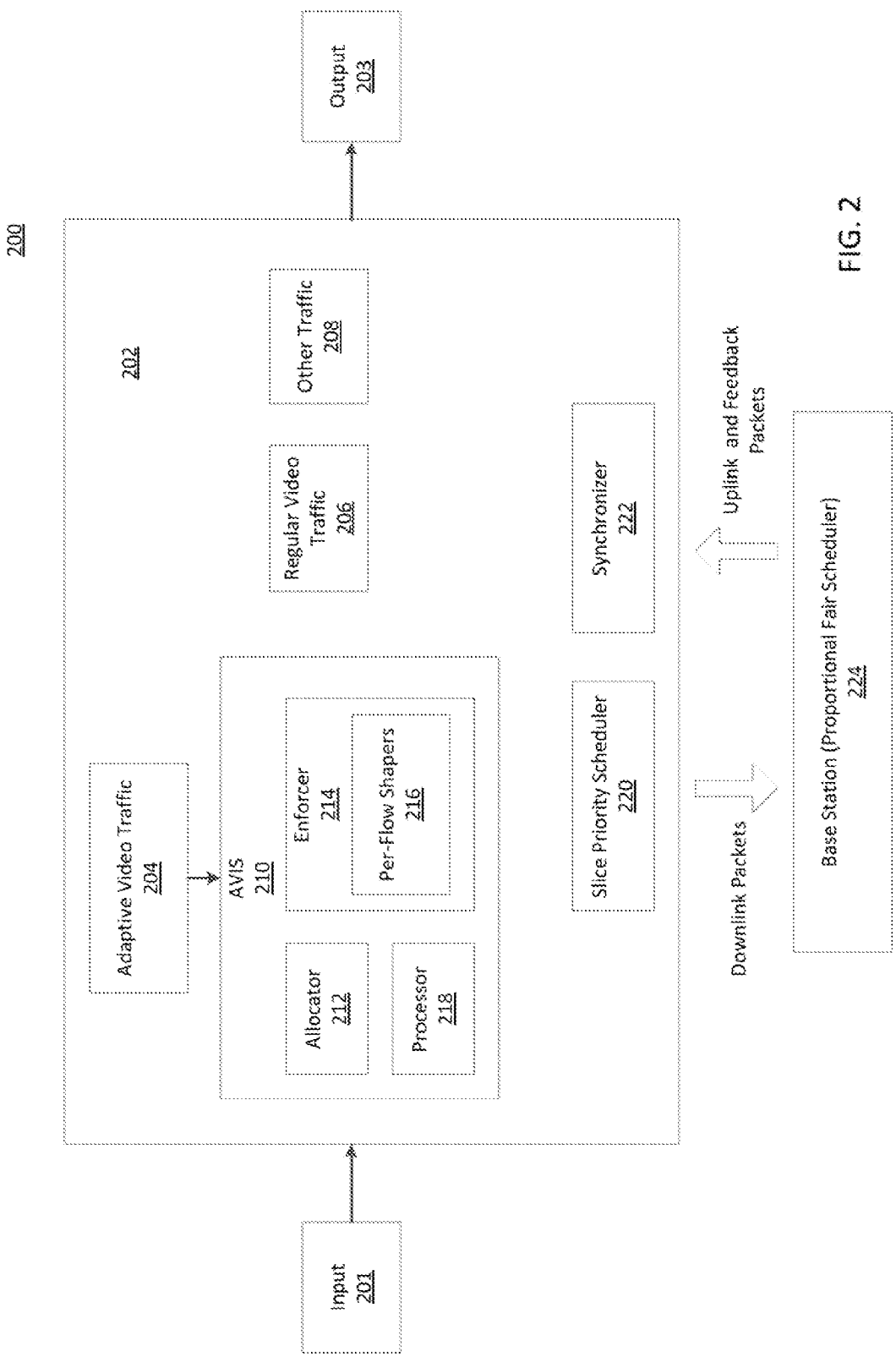
FIG. 2 shows a block/flow diagram illustrating a system/method for a resource management framework for adaptive video delivery according to the present principles.

Referring now to FIG. 2, a system/method for a resource management framework for adaptive video delivery 200 is illustratively depicted according to the present principles. In one embodiment, a resource management framework 210 may be employed according to the present principles to enable mobile operators to effectively achieve desired resource allocation, stable bit-rates, and high resource utilization across multiple dynamically adaptive video flows (e.g., DASH).

Network vs. Client: Designing the resource management framework according to the present principles as a network-based solution has at least the following advantages. It is easy to deploy since client solutions require changing the players of every content or application provider. Moreover, content providers may want to use their own proprietary adaptation algorithm to differentiate themselves. Furthermore, the wireless link is extremely dynamic due to user mobility and link quality fluctuations. The adaptation algorithm in clients typically takes several seconds to react and may fail to converge with a distributed algorithm. Since the network possesses the global knowledge, a centralized solution such as the resource management framework according to the present principles is more effective.

Gateway-Level Solution: Although the resource management framework according to the present principles 210 can manage resources at the base station level, it is beneficial to implement the resource management framework according to the present principles 210 to manage the resources of each base station independently as a gateway solution for at least the following reasons: (a) typically base stations have minimal computational resources since they need to be deployed at a large number of locations. Implementing the resource management framework according to the present principles on base stations would need a substantial increase in computational and memory requirements of base stations; and (b) network functionality equipment (e.g., Deep Packet inspection (DPI)) that can provide important meta-data information about video flows to the resource management framework according to the present principles 210 are typically co-located with the Mobile Core gateways.

Independent Scheduler: One option is to implement the resource management framework according to the present principles as a scheduler that jointly optimizes the resource allocation across adaptive video flows (e.g., DASH) 204, regular video flows 206 and other data traffic 208. However, in one embodiment according to the present principles, resource slicing techniques are employed by a serving gateway 202 to separate the resource management of adaptive video flows (e.g., DASH) 204 from regular video flows 206 and data flows (e.g., other traffic) 208. Such a design framework has several benefits. For example, the framework allows operators to set the allocation to the different slices or traffic types based on the long-term resource usage as seen in their networks. The resource slicing technique may ensure that any change in one slice (e.g., due to new users or user mobility) does not impact the allocation of resources to other slices. The resource management techniques for adaptive video flows (e.g., DASH) 204 and regular video flows 206 can be applied independently and operators can choose their own unique combination. This enables the system to be highly scalable, and able to easily accommodate future innovations.

In one embodiment, it is noted that there are at least three metrics which are important for the performance of a network when multiple DASH video flows share the same base station link. These metrics (fair allocation, stability, resource utilization) are important from the perspective of both mobile operators and users. With respect to fair allocation, in wireless systems, users have different link qualities or transmission rate depending upon their location from the base station and mobility pattern. Generally, base station schedulers perform Proportional Fair (PF) allocation across the users with the aim of achieving resource fairness across the users. Hence, the fairness metric for each user i may be defined as follows:

$$F_i = r_i/C_i \quad (1)$$

where $r_i$ is the rate allocated to the user and $C_i$ is the transmission rate of the user depending on its Signal-Noise Ratio (SNR). Once the fairness metric is computed for each user, the fairness index may be defined based on, for example, the Jain Fairness index:

$$JF = \left(\sum_{i=1}^{N} F_i\right)^2 / \left(N \sum_{i=1}^{N} F_i^2\right) \quad (2)$$

where N is the total number of active users in the system.

With respect to stability, from the users' perspective, in addition to the video bit-rate, the quality of a DASH video stream is severely impacted by the frequency of bit-rate switches. To measure the stability of the system, the total number of bit-rate switches perceived by the users during a video session may be employed according to the present principles. With respect to resource utilization, wireless resources are scarce and operators desire optimal usage of resources of their base stations. Hence the resource utilization may be defined as the ratio of the total resources allocated ($R_A$) to all the active users to the total resources $R_T$ available at the base station.

$$U = 100 R_A / R_T \quad (3)$$

The resource management framework according to the present principles 210 may be implemented as a gateway-level solution external to base stations (e.g., as a plugin module on serving gateways in LTE networks). The resource management for different traffic types may be performed in individual slices by employing a resource slicing technique including a slice priority scheduler 220 and a synchronizer 222. The resource management framework according to the present principles 210 may be implemented as a split architecture with at least two novel components, including: (a) an Allocator 212 that allows operators to define allocation for their users while streaming adaptive video flow (e.g., DASH) videos (similarly to a GBR bearer framework for regular single-rate video flows); and (b) an Enforcer 214 which may work with, or function as, a Proportional Fair (PF) scheduler 224 to ensure resource isolation across the streaming adaptive video (e.g., DASH) flows and to enforce the appropriate bit-rate selected by the allocator for each flow.

In one embodiment according to the present principles, a serving gateway 202 may receive input 201, and the input 201 may be resource sliced into adaptive video traffic 204, regular video traffic 206, and other traffic 208. The resource management framework according to the present principles 210 may receive the adaptive video traffic 204, and may employ a processor 218, and an allocator 212, and an enforcer 214, which may include per-flow shapers 216. The serving gateway 202 may then produce output in block 203.

In one embodiment, one goal of the allocator 212 is to manage the wireless resources of a plurality of base stations across a set of users streaming DASH video flows. Specifically, the allocator may take as input the various available choices of video bit-rates for all the users and converts these bit-rates to their actual radio resource requirements. It may then compute the optimal distribution of resources across the users by selecting the appropriate bit-rate for each user. The allocator may be invoked periodically (e.g., every i seconds) to ensure adaptability to user arrivals/departures and mobility. Next, the resource allocation problem may be formulated in a discrete-optimization framework 200 and may then describe the utility function in the context of achieving the two primary goals of fairness and stability. The same problem may also be formulated in a continuous-optimization framework to ease the computational complexity in the case of a system with large number of users.

In one embodiment, a discrete-optimization framework is employed for optimization. For example, let T be the total number of resource blocks of a base station assigned to the adaptive video traffic (e.g., DASH) flows. These resources may be distributed among N active users. the resource management framework according to the present principles 210 may assume that it can obtain bit rate information about the different encoded versions of the videos of each user i. Such information can be obtained from DPI middle boxes that are part of existing cellular networks. Let $M_i$ be the total number of the available encoded video bit-rate versions for a user i and let $r_{ij}$ denote the bit-rate of version j for user i. Since the users may have different link qualities, let $C_i$ denote the physical transmission rate depending upon the modulation and coding scheme (MCS) used by the base station for user i. This rate may represent the maximum number of bits that can be transmitted to the user per resource block. It is noted that the base station may perform coarse time-scale rate adaptation for each user depending upon the signal-to-noise ratio (SNR) for that particular user. Hence, the resource management framework according to the present principles 210 may obtain the average transmission rate $C_i$ each user from the base station. The utility $u_{ij}$ for each user may be defined as a function of the video bit rate index j, $x_{ij}$ may be defined as an indicator variable to represent the bit-rate selected for a user, and the penalty function may be defined as $f_{ij}$ to avoid frequent bit-rate switches. The resource allocation problem may then be formulated by the following method:

$$\text{Problem 1:} \quad \max_{x_{ij}} \sum_{i=1}^{N} \sum_{j=1}^{M_i} (u_{ij} - \alpha f_{ij}) x_{ij} \quad (4)$$

$$\text{Subject to} \quad \sum_{i=1}^{N} \sum_{j=1}^{M_i} \left\lceil \frac{r_i}{C_i} \right\rceil x_{ij} \leq T \quad (5)$$

$$\sum_{j=1}^{M_i} x_{ij} = 1, \forall i \quad (6)$$

In one embodiment, the first constraint above (Equation (5)) may be employed to ensure that the video bit rates allocated to the different users do not exceed the physical limit of the resources available at the base station (represented by T resource blocks). To convert the bit rate of the video flow of a user to actual resource blocks requirements, the bit-rate for each version j of video of user i may be scaled by its average transmission rate $C_i$ and ceil the value to the next highest integer $$\left(\text{e.g.,} \left\lceil \frac{r_i}{C_i} \right\rceil\right).$$

The second constraint (Equation (6)) may be employed to ensure that a unique version of each video must be selected for a particular user. Hence, the indicator variable $x_{ij}$ may be set to 1 if a bit-rate of version j is selected for user i, and 0 otherwise. A desired allocation achieved by maximizing the first part of the objective function in Problem 1 (i.e., the aggregate utility $u_{ij}$ across all users) may ensure that the resources of the base station are optimally allocated to the different users in accordance with the operators' policy. In one embodiment, the bit rate utility $u_{ij}$ may be defined as follows:

$$u_{ij} = P_i \log(r_{ij}) \quad (7)$$

The above choice of the utility function may include the following benefits: (a) the Log function is typically employed as a utility function for allocation of resources of a link in the network, and such a utility means that the marginal utility for a user may decrease as its video bit rate increases. In layman's terms, it means that an upgrade to the next higher bit rate (or a downgrade to the next lower bit-rate) for a user is more perceivable at lower current bit rates; and (b) users receiving a lower video bit-rate are allocated resources aggressively to ensure faster convergence to the desired allocation. the resource management framework according to the present principles may also define $P_i$ as the priority level of the user. This parameter can be set by the operator depending on the contract with the users.

In one embodiment, if the value of $P_i$ is set equally across the users, the resource management framework according to the present principles may achieve a proportional fair allocation across the users (in accordance with Equation (2)). Although the utility $u_{ij}$ only captures the bit-rate allocated to a user, the cost factor (which may depend on the users' transmission rate $C_i$) in the constraint defined in Equation (5) may ensure that the resource management framework according to the present principles allocates resources proportional to both the bit-rate of the video and the link quality of the user.

In one embodiment, there may exist a trade-off between fairness and utilization because due to the discrete set of bit-rates of DASH videos, allocating resources to achieve optimal fairness may result in loss in resource utilization. For example, consider 3 users streaming the same DASH video on a base station with a capacity of 4.5 Mbps. The bit-rates of the DASH video may be {0.5, 1, 2, 3} Mbps. While allocating 1 Mbps video bit-rate to each user would be optimally fair, the resource management framework according to the present principles instead may allocates the bit-rates 2, 1 and 1 Mbps to the users respectively to ensure high resource utilization. However, the resource management framework according to the present principles may be employed as a resource allocation solution that ensures optimal resource utilization. For instance, in the above example, with an allocation of 2 Mbps, 2 Mbps and 0.5 Mbps to the different users, respectively, the link would be entirely utilized, and the resource management framework according to the present principles ensures a balance of fair allocation and optimal utilization In one embodiment, there may exist a trade-off between fairness and stability. For example, while maximizing the first part (i.e., the aggregate bit-rate utility $u_{ij}$ for all users) of the objective function in Problem 1 ensures that the users receive the desired allocation according to operators' policies, it may result in frequent bit-rate switching for users. Depending upon the rate of arrival or departure of users and user mobility, the frequency of bit-rate switching across certain users may be relatively high, may cause annoyance to those users, and hence, degrade their quality of experience (QoE). To address this issue, the resource management framework according to the present principles may define a penalty function that may be subtracted from the utility function $u_{ij}$. The function $f_{ij}$ ensures that the users who experienced a higher number of switches during the previous interval W are not subject to further bit-rate switching.

Hence $f_{ij}$ may be defined as a monotonically increasing function of $S_i$, where $S_i$ is the number of bit-rate switches that a user has perceived in the previous W units of time. Furthermore, $f_{ij}$ may penalize different bit rates of a user in accordance with the user's current bit rate. For example, if a user's bit rate is changed directly to 2 Mbps from 0.5 Mbps, bypassing the bit-rate version of 1 Mbps, this may cause the resource management framework according to the present principles to account for it as two switches in the penalty function. Although there may be several possible choices for the function $f_{ij}$ that satisfy the above requirements, the resource management framework according to the present principles may advantageously employ the following function definition based on inferences from several simulation results. In one embodiment, j* may be defined as the user's current bit-rate.

$$f_{ij}=(|j-j^*|+1)S_i \qquad (8)$$

Figure 3A:
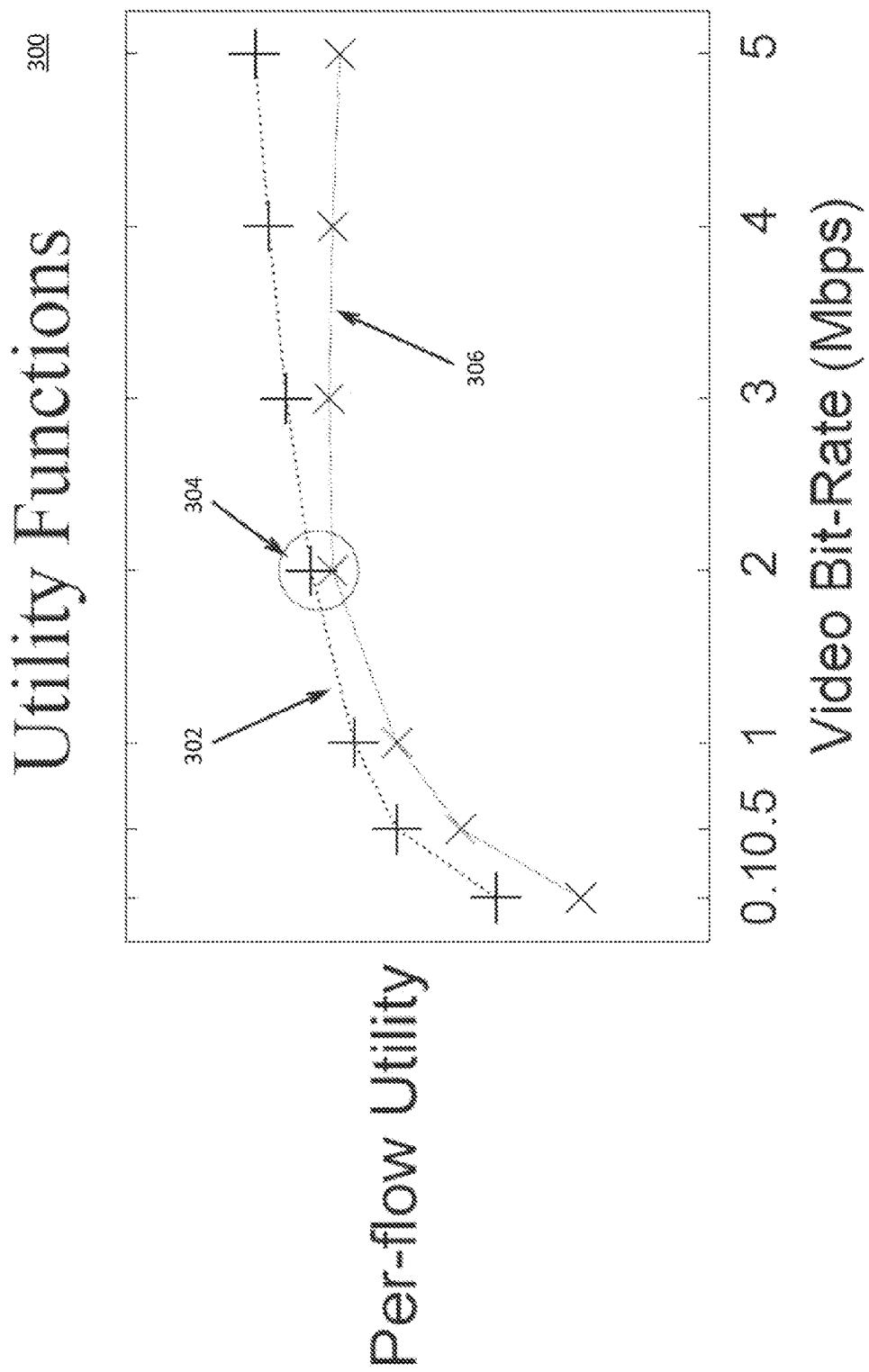
FIG. 3A shows a plot of per-flow utility versus video bit rate for performance of a resource management framework for adaptive video delivery according to the present principles.
Figure 3B:
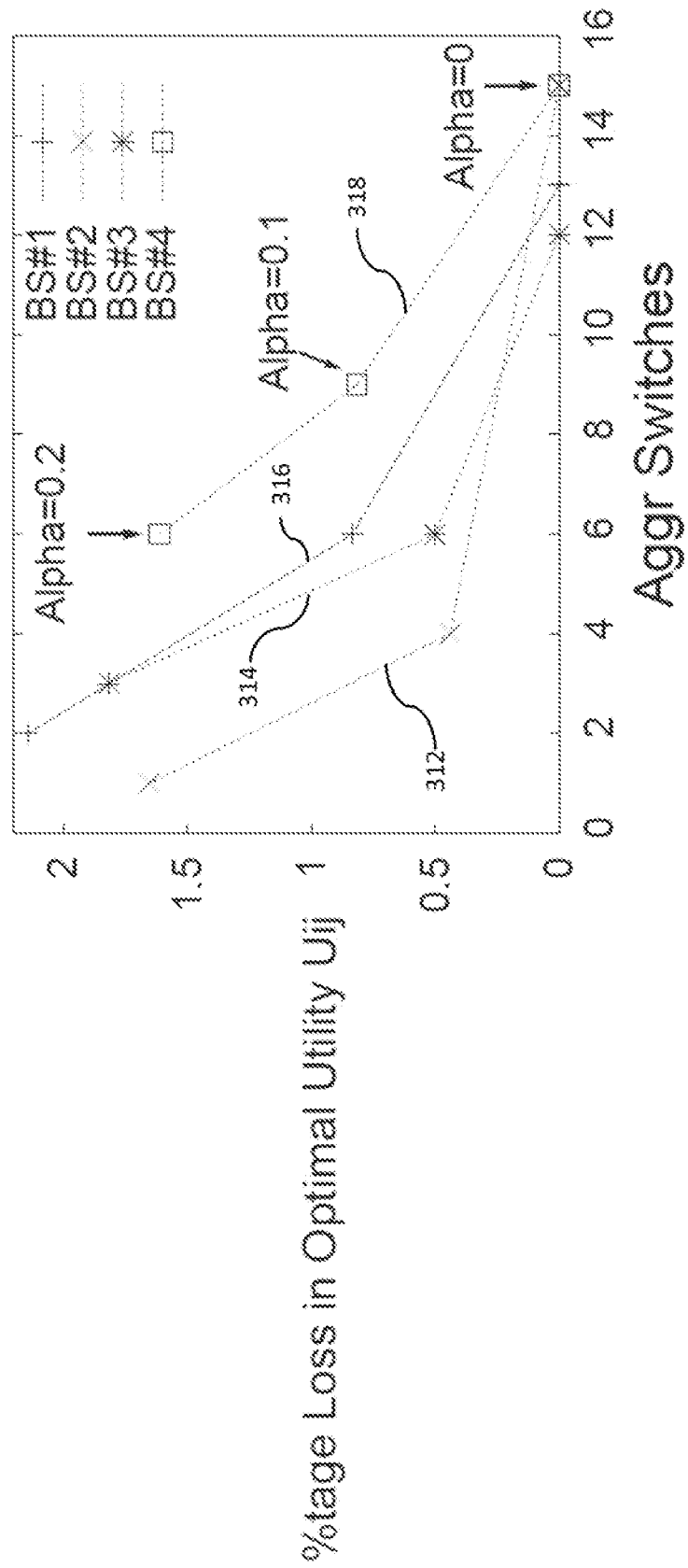
FIG. 3B shows a plot of loss in aggregate bit rate utility versus the total number of switches for different values for performance of a resource management framework for adaptive video delivery according to the present principles.
Figure 4:
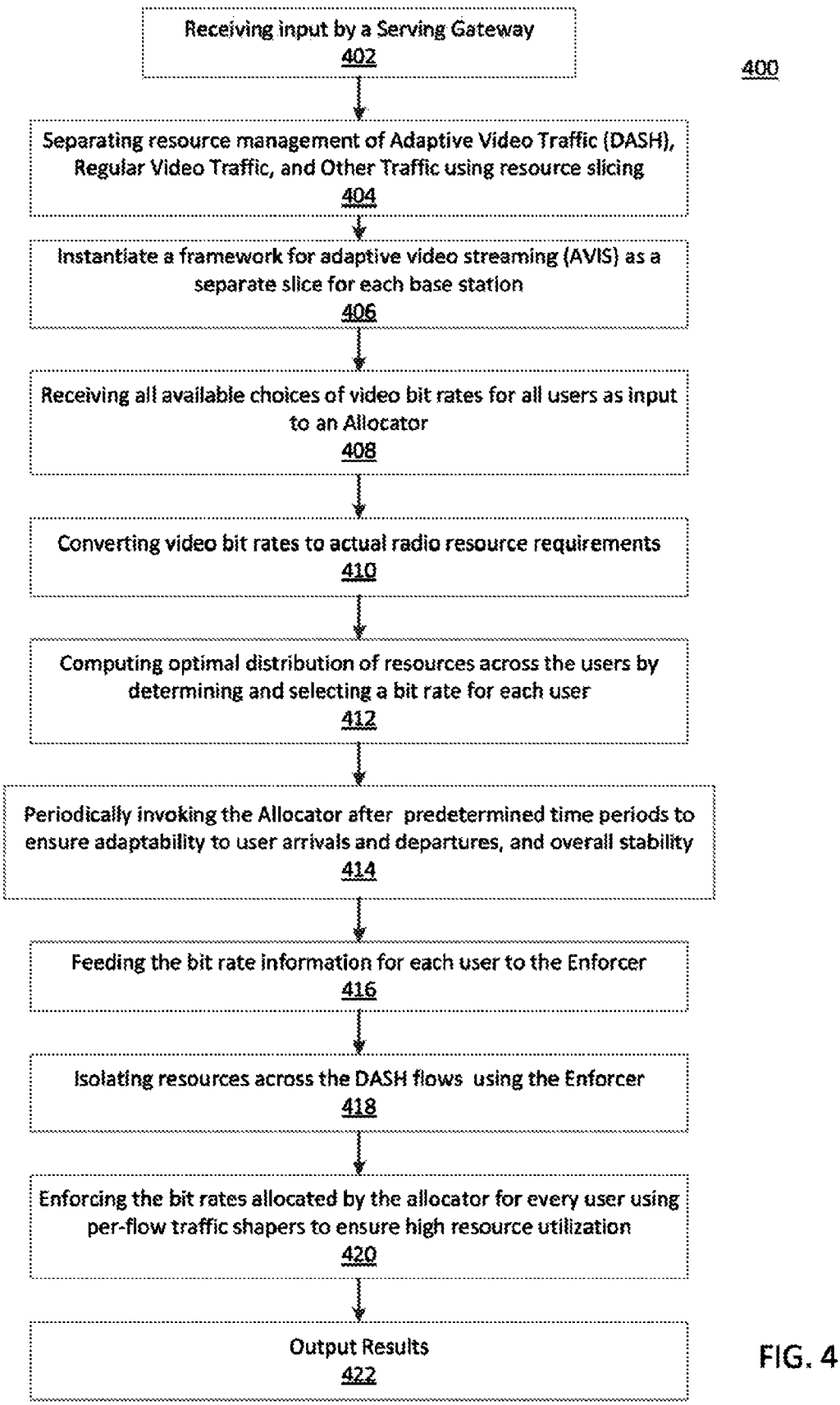
FIG. 4 shows a block/flow diagram illustrating a system/method for a resource management framework for adaptive video delivery according to the present principles.

Referring now to FIGS. 3A and 3B, with continued reference to FIG. 2, plots of per-flow utility versus video bit rate 300 and loss in aggregate bit rate utility versus the total number of switches for different values 310 are illustratively depicted according to the present principles to assist in the understanding of the objective function in Problem 1. In one embodiment, FIG. 3A depicts a graph for functions, (e.g., the bit-rate utility), $u_{ij}$, indicated by the curve 302 (that does not consider bit-rate switching) and the function $(u_{ij}x_{ij}-\alpha f_{ij})$, indicated by the curve 306 (that does consider a penalty for bit-rate switching), and includes the current bit rate at point 304. The functions may be plotted for specific values (e.g., in this example case $\alpha=0.01$, $S_i=10$ and j*=2 Mbps for a video stream with bit-rate versions={0.1, 0.5, 1, 2, 3, 4, 5} Mbps).

The parameter $\alpha$ allows an operator to effectively balance the goals of optimal bit-rate allocation and frequency of bit-rate switching per user (e.g., stability). While setting $\alpha=0$ ensures optimal bit-rate allocation at every execution step, increasing the value of $\alpha$ linearly may increase the effect of the penalty function $f_{ij}$. Hence, setting higher values of $\alpha$ will enable the resource management framework according to the present principles to stress more on bit-rate stability and QoE rather than on optimal allocation. To further illustrate this trade-off, a simulation for a network of four base stations, in which a trade-off of percentage loss in optimal utility vs. aggregate switches is represented for each base station by curves 312, 314, 316, 318, was conducted, and a graph 310 is plotted for the loss in the aggregate bit-rate utility (e.g., loss in the summation of the optimal values of $u_{ij}$ across all the users) versus the total number of switches for different values of $\alpha$ in FIG. 3B. As can be seen from the graph, increasing $\alpha$ decreases the aggregate number of bit-rate switches for users while also decreasing the aggregate bit-rate utility. The operator can set the value of a appropriately to balance between optimal allocation and stability.

In one embodiment, Problem (1) falls in the category of knapsack problems and can be solved using a dynamic program. The value of the objects may equate to the utility of the bit-rate version for a user and the weight of the object may equate to the link quality or transmission rate of that user. The objective function of Problem (1) that has to be maximized may be defined as $g_{ij}$ such that $g_{ij}=(u_{ij}-\alpha f_{ij})$. As seen in Method 1 (below), the resource management framework according to the present principles may first ensure that at least the base version of the video is selected for each user. To achieve this feasibility check, the versions of each video of all the users may be sorted such that $$\left[\frac{r_{i1}}{C_i}\right] \leq \left[\frac{r_{i2}}{C_i}\right] \leq \ldots \leq \left[\frac{r_{iM_i}}{C_i}\right].$$

The solution is feasible if at least the base versions can be supported $$\left(\text{e.g.,} \sum_{i=1}^{N} \left\lceil \frac{r_{i1}}{C_i} \right\rceil \leq T\right).$$

If this condition is not satisfied, the resource management framework according to the present principles may simply selects the base version for each user. If the feasibility check passes, the resource management framework according to the present principles computes the optimal bit-rate for each user as follows. Let $V(i,\tau)$ be the optimal utility of flows 1 through i using $\tau$ resource blocks. The solution to the problem may be given by $V(N,T)$. The optimal utility $V(i,\tau)$ may depend on which version j is chosen for user i. So for each version j, the optimal utility obtained by i−1 flows using $(\tau-\tau_{ij})$ resource blocks may be checked, and the overall utility $g_{ij}$ may be added. This check is valid only if the previous optimal utility is feasible. Otherwise, an infeasible solution for $V(i,\tau)$ has utility 0. Thus the following recursive relationship may be employed:

$$V(i, \tau) = \max_j \{0, V(i-1, \tau - \tau_{ij}) + g_{ij} \mid \qquad (9)$$
$$V(i-1, \tau - \tau_{ij}) > 0\}$$

In one embodiment, the resource management framework according to the present principles Allocator Method may be represented as follows:

---
Method 1-ALLOCATOR
---
1: Inputs: Utilities $g_{ij}$, bit-rates $r_{ij}$, transmission rates $C_i$, total recourse blocks T.
2: Outputs: Selected bit-rate for each user $x_{ij}$
3: Repeat: Every I units of time
4: $\quad \text{Sort} \left\lceil \frac{r_{i1}}{C_i} \right\rceil \leq \left\lceil \frac{r_{i2}}{C_i} \right\rceil \leq \ldots \leq \left\lceil \frac{r_{iM_i}}{C_i} \right\rceil$
5: $\quad \text{If } \sum_{i=1}^{N} \left\lceil \frac{r_{i1}}{C_i} \right\rceil \leq T$
6: Initialize $V(i, \tau) = 0$ when $i = 0$ or $\tau = 0$
7: Recursively compute: $V(i, \tau)$ using (9)
8: Output the solution that gives $V(N, T)$.
9: Else
10: Allocate each used the lowest bit-rate.

In another embodiment, a continuous-optimization framework is employed for optimization. For example, a dynamic program may have a complexity of O(NMT) where N is the number of users, $M=\max_i M_i$ is the maximum number of versions of the video of a user and T is the total number of resource blocks. The computational complexity of the solution may be NP-complete since the problem is proportional to the value of T (e.g., the number of bits in T). Hence for large values of T, the computation complexity may grow significantly with large number of users N and video bit-rate versions M.

As an example to help gain a full understanding of the possible values for T, in LTE the total number of resource blocks may be 24000 every second. Although the actual complexity may be lower because each user is allocated their minimum bit-rate video version; to ease the computational complexity of the system with large number of users and video versions, one approach is to alternatively formulate Problem 1 as a continuous optimization problem. Specifically, the optimization variable $r_i$ that represents the rate allocated to each user may be defined as a continuous variable constrained by the maximum encoded available bit-rate of the video.

$$\text{Problem 2: } \max_{r_i} \sum_{i=1}^{N} (u_i - \alpha f_i) \qquad (10)$$

$$\text{Subject to } \sum_{i=1}^{N} \frac{r_i}{C_i} \leq T \qquad (11)$$

$$0 < r_i \leq r_{iM_i}, \forall i \qquad (12)$$

In one embodiment, the continuous problem may be defined with similar goals as those for the discrete problem (Problem (1)). The first constraint (Equation (11)) ensures that the resource constraint of the base station is met while the second constraint (Equation (12)) ensures that the rate allocated to the user is within the maximum bit-rate version for the video streamed by that user. The utility for each user may be defined as a log function of the allocated rate:

$$u_i = P_i \log(r_i) \qquad (13)$$

and the penalty function to control the frequency of bit-rate switching per user may be defined similarly to the discrete optimization case:

$$f_i = \left(\sqrt{(r_i - r_i^*)^2} + 1\right) S_i \qquad (14)$$

where $r_i^*$ is the current bit-rate that is being streamed to user i. Once the solution to Problem (2) is solved using known techniques (e.g., interior point method), the continuous optimal variables (e.g., $r_i$) may be quantized to a discrete value (e.g., $r_{ij}$) among the available choices for bit-rates of user i. For example, if the available video bit-rates of a DASH flow are {1, 2, 3} Mbps, and the optimal solution of the continuous resource allocation problem is $r_{ij}$=1.45 Mbps, then $r_i$ may be quantized to either 1 or 2 Mbps to obtain $r_{ij}$. Although it may be possible to design a quantization technique that achieves optimality and returns a solution similar to the discrete-based optimization (Problem 1), such techniques result in similar computational complexity as the discrete-based optimization. Hence, the present system/method ensures that lighter computational complexity is employed to trade-off optimal resource allocation.

The present solution may be based on a greedy approach to minimize the loss in utilization of the wireless resources. In one embodiment, the users are first sorted in increasing order of the wireless resource requirement to their bit-rate $r_i$ to the next higher bit rate version. The solution $r_i$, may then be floored to the next lowest bit rate version for all users i. The amount of wireless resources that are unused after satisfying all the users may be computed with the floored version of their optimal bitrates. Next, the sorted list may be scanned through to upgrade the maximum number of users until the resources are exhausted.

This approach may trade off the optimality in the solution to achieve a reduction in the computational complexity. The above method achieves results very similar to the discrete-based optimization solution. Although the above method achieves a complexity order of O(N), note that the step-wise computation time of the continuous problem (Problem 2) may be larger than the step-wise execution time for the dynamic program that solves the discrete optimization problem. Nonetheless, the choice to determine which method to employ may be left to the operator, although in one embodiment the resource management framework according to the present principles employs the discrete optimization as defined in Problem (1) by default.

Referring again to FIG. 2, in one embodiment, once the allocator computes the appropriate bit rate version $r_{ij}$ for each user i, it may feed this information to the enforcer 214. The resource management framework according to the present principles enforcer 214 may be similar to a proportional fair (PF) scheduler that may be employed on base stations 224, and may include the ability to perform per-flow traffic shaping using per-flow shapers 216. The enforcer 214 may be configured to meet three key requirements: (a) enabling isolation of resources across the DASH flows, and as such, if the link quality of a user improves or degrades, it does not affect the resource allocation for the other DASH flows; (b) enabling stability by making sure that the bit rates allocated by the allocator are enforced for every user; and (c) enabling high resource utilization. To ensure that each flow at least receives sufficient TCP throughput to support the bit-rate allocated to it by the allocator, the enforcer may define a minimum rate for each flow and may set it to the bit-rate $r_{ij}$ allocated to that flow.

$$\text{MinRate}_i = r_{i,j} \quad (15)$$

In one embodiment, the enforcer 214 may function as a weight-based packet scheduler that performs scheduling of the packets of different DASH flows proportional to the flow's minimum rate. If the effective capacity of the base station increases during the time period before the allocator is invoked gain, the enforcer 214 may ensure that the additional resources are allocated to the different flows proportional to their minimum rate. However, if the capacity decreases, the enforcer 214 may allocate rates that are proportional fractions of the minimum rate of the flow.

To meet the second goal of enabling stability by making sure that the bit rates allocated by the allocator are enforced for every user, the enforcer 214 may employ per-flow traffic shapers 216. The shapers may not allow more than a maximum rate to be allocated to a flow despite availability of resources. The maximum rates for each flow may be set according to their selected bit-rates $r_{ij}$. This ensures that the TCP throughput of the flows will not exceed the shaping rate. Hence the flows may not adapt to higher bit-rates despite availability of excess wireless resources ensuring stability of bit-rates. To meet the final goal of high utilization, the per-flow shaper rate may be set to the mean of the bit-rate allocated to the flow and the bit-rate of the next version of the video for that flow.

This design choice was implemented because most videos have variable bit rate (VBR) traffic patterns and their instantaneous rates can fluctuate around their average bit rates. If the instantaneous requirement for a certain flow is above its average bit rate, the enforcer can borrow resources from a flow whose instantaneous rate is below its average bit rate. Hence, setting the maximum rate for the flows above their average bit-rate value enables the enforcer 214 to leverage statistical multiplexing across the video flows to obtain high resource utilization. While the shaping rate could be set to higher values, the resource management framework according to the present principles 210 may set it in the following way to ensure that the client players do not switch to higher bit-rates than those selected by the allocator:

$$\text{MaxRate}_i = \frac{r_{i,j} + r_{i,j+1}}{2} \quad (16)$$

While the maximum shaping rate is critical to the operation of the enforcer 214, the interval at which the shaping is performed is also important. Hence while the allocator 212 may operate at coarse time-scales, the enforcer may schedule the flows at much fine time-scales. For example, in one embodiment, if the allocator 212 executes 10 seconds, the enforcer 214 may schedule at 10 millisecond granularity with traffic shaping performed at time-scales of 250 milliseconds.

In one embodiment, a choice of penalty function $f_{ij}$ that is employed in the objective in the resource allocation problem (Problem (1)) ensures that the operator can balance between optimal bit-rate allocation and stability of bit-rates across its users. The choice of the penalty function $f_{ij}$ is an important design consideration for the resource management framework according to the present principles, as it directly impacts the effect of a user's recent bit-rate switch on the user's future bit-rate allocation. Hence, tradeoff between the optimal allocation and stability for the following penalty functions may be benchmarked. The functions are defined as additive, multiplicative and exponential respectively:

$$f_{ij}^{(1)} = |j - j^*| + 1 + S_i \quad (17)$$

$$f_{ij}^{(2)} = (|j - j^*| + 1) S_i \quad (18)$$

$$f_{ij}^{(3)} = 2^{|j - j^*| + 1 + S_i} \quad (19)$$

In one embodiment, a setup with several base stations for different runs of the resource management framework according to the present principles employing the above penalty functions for a range of values for $0 \le \alpha \le 1$ (as defined in Problem (1)) may be employed. Trade-off curves between the loss in the optimal bit-rate utility (which is obtained by computing the optimal value of aggregate bit-rate utility $u_{ij}$ across all users in Problem 1 with $\alpha = 0$ and the total number of bitrate switches per user) may be generated. The additive function is generally insensitive to the number of bit rate switches, and fails to lower the number of bit-rate switches even for high values of $\alpha$, and the exponential function is too aggressive to recent bit rate switches and is highly sensitive to $\alpha$. Hence, the multiplicative function is employed for the resource management framework according to the present principles since its trade-off curve lies at a sweet spot and allows the operator to further balance between the two metrics by setting $\alpha$ appropriately based on the trade-off curve.

In one embodiment, the effect of increasing capacity fluctuations on the loss in optimal bit-rate utility ($u_{ij}$) and number of bit-rate switches for the users may be measured and plotted on a graph if desired. The frequency of capacity fluctuations is increased by increasing the users' arrival rate and their mobility speeds. The loss in the optimal allocation obtained by the resource management framework according to the present principles increasingly diverges from the optimal allocation obtained by a nondeterministic polynomial time (np)-resource management framework with increasing capacity fluctuations. However, the resource management framework according to the present principles ensures that the number of bit-rate switches for the users is lower than that with the np-resource management framework according to the present principles. This is because the np-resource management framework according to the present principles optimizes for the bit-rate utility $u_{ij}$ at every execution step and changes the allocated video bit-rate of the users when the effective capacity changes. The resource management framework according to the present principles also may consider the past bit-rate switches for the user before making a decision on changing its bit-rate in response to a change in the effective capacity.

The resource management framework according to the present principles may also be employed with an exponential penalty function (Equation (19)). The exponential penalty function may cause a further drop in the optimal allocation as compared to the resource management framework according to the present principles, but the reduction in the number of bit-rate switches is not significant when compared to the resource management framework according to the present principles, and this result is one reason why a multiplicative penalty function is employed in one embodiment of the resource management framework according to the present principles.

In one embodiment, with respect to convergence under stable channel conditions, the presence of the bit rate penalty function causes the resource management framework according to the present principles's rate allocation decision to differ from that of the np-resource management framework according to the present principles. The np-resource management framework according to the present principles may find the rate allocation that simply maximizes $u_{ij}$. On the other hand, the bit rate switching penalty means that the resource management framework according to the present principles tries to maximize $u_{ij}$ but does not significantly change the rate allocation from its current value. Intuitively, if channel conditions remain stable for a long time, $u_{ij}$ should be maximized, regardless of past bit rate switches. This leads to the question of whether, under stable channel conditions, the resource management framework according to the present principles's rate allocation converges to the rate allocation that maximizes $u_{ij}$. In the special case of the continuous problem formulation (Problem (2)), the resource management framework according to the present principles's rate allocation can be shown to converge to the solution of the np-resource management framework according to the present principles. This special case is when $F_S(S_i)=(r_i-curr_i)^2+1$, (e.g., the bit rate penalty function does not consider the previous number of switches experienced $S_i$).

These convergence results in the special case lead next to evaluating convergence for the more general problem setup of Problem (2). For example, in a simulation, channel conditions may be perturbed for the first 100 time slots and the channel may be kept constant in the remaining 100 time slots. The utility and cumulative switches obtained by the np-resource management framework according to the present principles and the resource management framework according to the present principles may be measured and plotted during the stable channel period. Since the np-resource management framework according to the present principles does not penalize bit rate switches, it immediately chooses the rate allocation corresponding to the optimal $u_{ij}$. the resource management framework according to the present principles also converges to the optimal $u_{ij}$, although it takes some time, and also experiences a number of bit rate switches. This means that the rate allocation chosen by the resource management framework according to the present principles may have converged to the solution of the np-resource management framework according to the present principles. AVIS may also be analyed when it uses the exponential penalty function (Equation (19)), and in that case, the np-resource management framework according to the present principles converges slightly slower than the resource management framework according to the present principles but with fewer numbers of switches, due to its increased penalty on bit rate switches.

In one embodiment, the resource management framework according to the present principles may be evaluated using a WiMAX test bed. The test bed consists of an Access Service Network (ASN) gateway, three base stations (e.g., PicoChip WiMAX femtocell base stations (IEEE 802.16e compliant)), and several clients (e.g., Intel WiMAX clients). The ASN gateway may provide an interface to the base station for setting up service flows in the downlink and the uplink direction for each client when it registers.

Referring again to FIG. 1, in one embodiment, the resource management framework according to the present principles may be implemented as a user-level Click module (not shown) in the ASN gateway 110. The Click module may intercept all data packets from the base station in the downlink. A click classifier may be configured to route packets belonging to the DASH flows through the resource management framework module according to the present principles. The PicoChip base station(s) 102, 104, 106 may provide feedback on the average multiple connections per second (MCS) per client to the resource management framework according to the present principles scheduler every i units of time.

When this feedback is received, allocator in the resource management framework according to the present principles may select the video bit-rate version j for each user i and may set the shaper rate appropriately for each flow based on the feedback. the resource management framework according to the present principles may maintain a separate queue for each flow and may perform weighted packet scheduling and rate-shaping for each flow, depending on the bit-rate allocated to each flow by the allocator.

On the client-side, an Adobe OSMF player that runs as a browser-plugin may be employed. The player may be modified to record certain parameters like chunk throughput, bit-rate etc. at the client side. The videos may be fetched over the internet using, for example, an Akamai hosted CDN server, and in one example, all the videos are about 4 minutes in length and are encoded to the following bit-rate versions: {0.5, 0.75, 1.15, 1.55, 1.95, 2.35, 2.75, 3.25} Mbps.

Benchmarking the Enforcer: Although the enforcer 214 may leverage the PF scheduler 224 to ensure bit rate allocation to each user, configuring the per-flow shapers 216 is critical to its performance. Two metrics have been observed to significantly affect the efficacy of the enforcer in terms of stability of the bitrates of the users: (a) shaper rate; and (b) shaping interval. In one embodiment, the WiMAX base station(s) may be set up with 4 clients placed at similar location such that their link qualities are similar (QPSK), and the results may be analyzed.

With respect to the Shaper Rate, the resource management framework according to the present principles may employ a shaping or maximum rate to each flow depending upon its assigned bite rate (Equation 16). While it seems intuitive to set the shaping rate to the bit rate assigned to a user, such a setting causes the player to switch to a lower bit rate mainly due to buffer underflow. In one exemplary embodiment, three flows are allocated a bit-rate of 0.5 Mbps each by the allocator 212 and the enforcer 214 sets their shaping rate to 0.5 Mbps. The bit rates for all the videos may switch to the lower bit-rate of 0.25 Mbps frequently.

While it is possible to set the shaping rate to higher values to increase stability and utilization, setting it too high causes the player to upgrade to the next higher bit rate version. For example, setting the shaper rate to the next higher bit-rate than the one allocated to the user causes the player to switch between the assigned bit-rate and the next higher bit-rate version. In one embodiment, the shaping rate of the four users is set to 1.15 Mbps once the allocator assigns the bit rate (0.75 Mbps to each user), and the bit-rates of the users switch to a higher bit-rate occasionally. Hence taking the middle-ground, the shaping rate may be set as the mean of the assigned bit-rate and the next higher bit-rate, as detailed in Equation 16.

With respect to the Shaping interval, the shaping interval may determine the time interval or granularity at which the shaping for each flow is performed. In one embodiment, the shaping interval may be set as 1 second (based on the default value used by most commercial base station schedulers). All of the four users (discussed above) are assigned a bit-rate of 0.5 Mbps and the shaping rate is set to 0.65 Mbps with a shaping interval of 1 second. This setting causes the players to switch to an upper bit-rate version during some time intervals, and several video chunks (especially during static scenes) have a relatively smaller size and may get downloaded within a second. A series of such chunks causes the player to overestimate the throughput, and as such, a preferred embodiment of the resource management framework according to the present principles employs a shaping interval of 250 milliseconds.

In one embodiment, the resource management framework according to the present principles is a system/method for a flow management framework for adaptive video delivery over Cellular networks. The resource management framework according to the present principles is effective in allocating the resources of a base station across multiple DASH flows and effectively balances between three important goals: (a) fair allocation (b) stability of a user's bit-rate and (c) resource utilization of the base station. While the problem of video delivery has been extensively studies in the past, this is the first work that designs and implements a complete and practical solution for DASH videos streamed over Cellular networks.

Referring now to FIG. 5, a method for resource management for adaptive video delivery 500 is illustratively depicted according to the present principles. IN one embodiment, input is received by a serving gateway in block 402, and resource management may be separated for management of Adaptive Video Traffic (e.g., DASH), Regular video traffic, and other traffic using resource slicing in block 404, thereby functioning as an independent scheduler for different resource types. A framework for adaptive video streaming according to the present principles may be instantiated as a separate slice for each base station in block 406, and may schedule resources allocated by the allocator using a slice priority scheduler across the DASH flows. It is noted that AVIS may be employed at the network level as a network based solution, and may be implemented as a split architecture which includes an allocator and an enforcer. All available choices of video bit rates for all users may be received as input to an allocator in block 408, and the video bit rates may be converted to actual radio resource requirements in block 410.

Optimal distribution of resources across the users may be computed by determining and selecting an appropriate bit rate for each user in block 412, and the allocator may be periodically invoked (e.g., every I seconds) to ensure adaptability to user arrivals and departures, and overall stability in block 414. The bit rate information may be fed to the enforcer in block 416, and the enforcer may isolate resources across the DASH flows in block 418. The bit rates allocated to the enforcer may be enforced for every user by employing per-flow traffic shapers to ensure high resource utilization in block 420, and the results may be output in block 422. In one embodiment, the enforcer does not allow the traffic of each user to be more than a maximum rate as given by Equation (1) above and the time interval that the traffic rate is not allowed to exceed the maximum rate for may be given by Equation (2) above.

Having described preferred embodiments of a scheduling framework for adaptive video delivery over cellular networks (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for adaptive video delivery over a network, comprising:
    receiving a plurality of types of data flows from one or more network base stations;
    separating resource management of the plurality of types of data flows, wherein the plurality of types of data flows include one or more of adaptive video streaming flows, regular video traffic flows, and other traffic flows by resource slicing;
    instantiating a scheduling framework for adaptive video delivery;
    receiving available choices of video bit rates for all users as input to an allocator;
    computing optimal allocation of resources for all users by determining and selecting an optimal bit rate for each user using the allocator, wherein the optimal allocation of resources for all users is determined using a discrete optimization method, and the discrete optimization method may be represented as follows:

$$\max_{x_{ij}} \sum_{i=1}^{N} \sum_{j=1}^{M_i} (u_{ij} - \alpha f_{ij}) x_{ij}$$

$$\text{subject to } \sum_{i=1}^{N} \sum_{j=1}^{M_i} \left\lceil \frac{r_{ij}}{C_i} \right\rceil x_{ij} \leq T$$

$$\sum_{j=1}^{M_i} x_{ij} = 1, \forall i$$

where:

$u_{ij} = P_i \log(r_{ij})$ $f_{ij} = (|j - j^*| + 1) S_i,$ where N is a number of active users, $M_i$ is a total number of available encoded video bit rate versions, j is a video bit rate index, i is a user, $x_{ij}$ is an indicator variable, $u_{ij}$ is a function of the video bit rate index j, $f_{ij}$ is a penalty function, $r_{ij}$ is a bit rate of version j for user i, $C_i$ is a physical transmission rate, and T is a number of resource blocks;
    sending the optimal bit rate for each user to an enforcer;
    isolating resources across the adaptive video streaming flows using the enforcer; and
    enforcing the optimal bit rate for each user using one or more per-flow traffic shapers to maximize resource utilization without reaching network capacity.

2. The method as recited in claim 1, wherein the optimal allocation of resources for all users is determined using a continuous optimization method, wherein a bit rate $r_i$ is a continuous variable, and the continuous optimization method may be represented as follows:

$$\max_{r_i} \sum_{i=1}^{N} (u_i - \alpha f_i)$$

$$\text{subject to } \sum_{i=1}^{N} \frac{r_i}{C_i} \leq T$$

$$0 < r_i \leq r_{iM_i}, \forall i$$

where:

$$u_i = P_i \log(r_i)$$

$$f_i = \left(\sqrt{(r_i - r_i^*)^2} + 1\right) S_i,$$

where N is a number of active users, $M_i$ is a total number of available encoded video bit rate versions, i is a user, $u_i$ is a function of a bit rate utility, $P_i$ is a priority level of the user i, $f_i$ is a penalty function, $r_i$ is a current bit rate for the user i, $C_i$ is a physical transmission rate, $S_i$ is a number of bit rate switches, and T is a number of resource blocks.

3. The method as recited in claim 1, wherein the network is a wireless network.

4. The method as recited in claim 3, further comprising:
sorting a list of each user in increasing order of a wireless resource requirement to upgrade their optimal bit rate to a next higher bit rate version;
flooring the optimal bit rate version to a next lowest bit rate version for all users;
computing an amount of wireless resources that are unused after satisfying all user requirements with the floored optimal bit rate version; and
scanning the sorted list to upgrade the maximum number of users until all the wireless resources are exhausted.

5. The method as recited in claim 1, wherein the scheduling framework for adaptive video delivery is instantiated as a separate slice for each base station.

6. The method as recited in claim 1, wherein the one or more per-flow traffic shapers are configured to restrict traffic flow to the optimal bit rate determined by the allocator despite any availability of excess resources.

7. The method as recited in claim 1, wherein the allocator is periodically invoked after a predetermined time period to ensure adaptability to user arrivals and departures, and overall stability.

8. A system for adaptive video delivery over a network, comprising:
a gateway configured to receive a plurality of types of data flows from one or more network base stations;
a slice priority scheduler configured to separating resource management of the plurality of types of data flows, wherein the plurality of types of data flows include one or more of adaptive video streaming flows, regular video traffic flows, and other traffic flows by resource slicing;
scheduling framework for adaptive video delivery;
an allocator configured to receive available choices of video bit rates for all users as input, to compute optimal allocation of resources for all users by determining and selecting an optimal bit rate for each user using the allocator, and to send the optimal bit rate for each user to an enforcer, wherein the optimal allocation of resources for all users is determined using a discrete optimization method, and the discrete optimization method may be represented as follows:

$$\max_{x_{ij}} \sum_{i=1}^{N} \sum_{j=1}^{M_i} (u_{ij} - \alpha f_{ij}) x_{ij}$$

$$\text{subject to } \sum_{i=1}^{N} \sum_{j=1}^{M_i} \left\lceil \frac{r_{ij}}{C_i} \right\rceil x_{ij} \leq T$$

$$\sum_{j=1}^{M_i} x_{ij} = 1, \forall i$$

where:

$$u_{ij} = P_i \log(r_{ij})$$

$$f_{ij} = (|j - j^*| + 1) S_i,$$

where N is a number of active users, $M_i$ is a total number of available encoded video bit rate versions, j is a video bit rate index, i is a user, $x_{ij}$ is an indicator variable, $u_{ij}$ is a function of the video bit rate index j, $f_{ij}$ is a penalty function, $r_{ij}$ is a bit rate of version j for user i, $C_i$ is a physical transmission rate, and T is a number of resource blocks;
an enforcer configured to isolate resources across the adaptive video streaming flows; and
one or more per-flow traffic shapers configured to enforce the optimal bit rate for each user using to maximize resource utilization without reaching network capacity.

9. The system as recited in claim 8, wherein the optimal allocation of resources for all users is determined using a continuous optimization method, wherein a bit rate $r_i$ is a continuous variable, and the continuous optimization method may be represented as follows:

$$\max_{r_i} \sum_{i=1}^{N} (u_i - \alpha f_i)$$

$$\text{subject to } \sum_{i=1}^{N} \frac{r_i}{C_i} \leq T$$

$$0 < r_i \leq r_{iM_i}, \forall i$$

where:

$$u_i = P_i \log(r_i)$$

$$f_i = \left(\sqrt{(r_i - r_i^*)^2} + 1\right) S_i,$$

where N is a number of active users, $M_i$ is a total number of available encoded video bit rate versions, i is a user, $u_i$ is a function of a bit rate utility, $P_i$ is a priority level of the user i, $f_i$ is a penalty function, $r_i$ is a current bit rate for the user i, $C_i$ is a physical transmission rate, $S_i$ is a number of bit rate switches, and T is a number of resource blocks.

10. The system as recited in claim 8, wherein the network is a wireless network.

11. The system as recited in claim 10, further comprising:
sorting a list of each user in increasing order of a wireless resource requirement to upgrade their optimal bit rate to a next higher bit rate version;
flooring the optimal bit rate version to a next lowest bit rate version for all users;

computing an amount of wireless resources that are unused after satisfying all user requirements with the floored optimal bit rate version; and scanning the sorted list to upgrade the maximum number of users until all the wireless resources are exhausted.

12. The system as recited in claim 8, wherein the scheduling framework for adaptive video delivery is instantiated as a separate slice for each base station.

13. The system as recited in claim 8, wherein the one or more per-flow traffic shapers are configured to restrict traffic flow to the optimal bit rate determined by the allocator despite any availability of excess resources.

14. The system as recited in claim 8, wherein the allocator is periodically invoked after a predetermined time period to ensure adaptability to user arrivals and departures, and overall stability.

* * * * *